US011074305B1

(12) United States Patent
Ruiz et al.

(10) Patent No.: US 11,074,305 B1
(45) Date of Patent: Jul. 27, 2021

(54) EXTENDING DATA STORE OPERATIONS USING FUNCTION OBJECTS

(71) Applicant: Amazon Technologies, Inc., Seattle, WA (US)

(72) Inventors: Michael Joseph Ruiz, Bainbridge Island, WA (US); David Ricardo Rocamora, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 341 days.

(21) Appl. No.: 15/066,963

(22) Filed: Mar. 10, 2016

(51) Int. Cl.
*G06F 16/951* (2019.01)
*H04L 29/08* (2006.01)

(52) U.S. Cl.
CPC ........ *G06F 16/951* (2019.01); *H04L 67/1097* (2013.01)

(58) Field of Classification Search
CPC ............................ G06F 16/951; H04L 67/1097
See application file for complete search history.

(56) References Cited

U.S. PATENT DOCUMENTS

| | | | | |
|---|---|---|---|---|
| 5,963,744 A * | 10/1999 | Slavenburg | ......... | G06F 9/30014 345/505 |
| 2003/0195639 A1* | 10/2003 | Nixon | ....................... | G06F 8/40 700/19 |
| 2003/0236859 A1* | 12/2003 | Vaschillo | .............. | G06F 16/986 709/218 |
| 2008/0092150 A1* | 4/2008 | Jethi | ....................... | G06F 16/95 719/328 |
| 2009/0055876 A1* | 2/2009 | James | ................ | H04N 21/4184 725/68 |
| 2010/0318598 A1* | 12/2010 | Yun | .......................... | G06F 9/54 709/203 |
| 2012/0143896 A1* | 6/2012 | Gatter | .................. | G06F 16/313 707/769 |
| 2013/0138495 A1* | 5/2013 | Lemphers | .............. | G06N 20/00 705/14.26 |
| 2015/0074743 A1* | 3/2015 | Ilieva | ...................... | H04L 63/10 726/1 |
| 2016/0080493 A1* | 3/2016 | Roth | ..................... | H04L 63/083 709/203 |
| 2016/0350303 A1* | 12/2016 | Fischer | ................. | G06F 16/258 |
| 2016/0350367 A1* | 12/2016 | Fischer | ................. | G06F 16/258 |

* cited by examiner

*Primary Examiner* — Eliyah S. Harper
(74) *Attorney, Agent, or Firm* — Davis Wright Tremaine LLP

(57) ABSTRACT

A technology is described for extending a data store operation using a function object. An example method may include receiving a request that includes request attributes to execute a data store operation. The request may be received at a data store system via a virtual computer network in a service provider environment. After receiving the request to execute the data store operation, the request may be analyzed to identify a request attribute associated with a function object that extends the functionality of the data store operation. The function object associated with the request attribute may be identified and the function object may be executed in association with executing the data store operation.

21 Claims, 7 Drawing Sheets

EXTENDING DATA STORE OPERATIONS USING FUNCTION OBJECTS

BACKGROUND

A data store service may include a collection of programs that enables a user to store, modify, and extract information from a data store. Many different types of data store services exist, ranging from small systems that execute on client devices to large systems that run on mainframe servers. Data store services can differ widely in the way that data is organized within a particular data store service. For example, data may be organized using relational, flat, and hierarchical techniques.

Virtualization technologies for computing resources may allow various computing resources or computing services to be shared by multiple users. These shared computing services may provide client applications with access to shared storage services managed by a data store service. Interactions between client applications and the shared storage service may typically include data store operations, such as read operations (read-only queries), write operations (to store data), and update operations.

DETAILED DESCRIPTION

Figure 1:
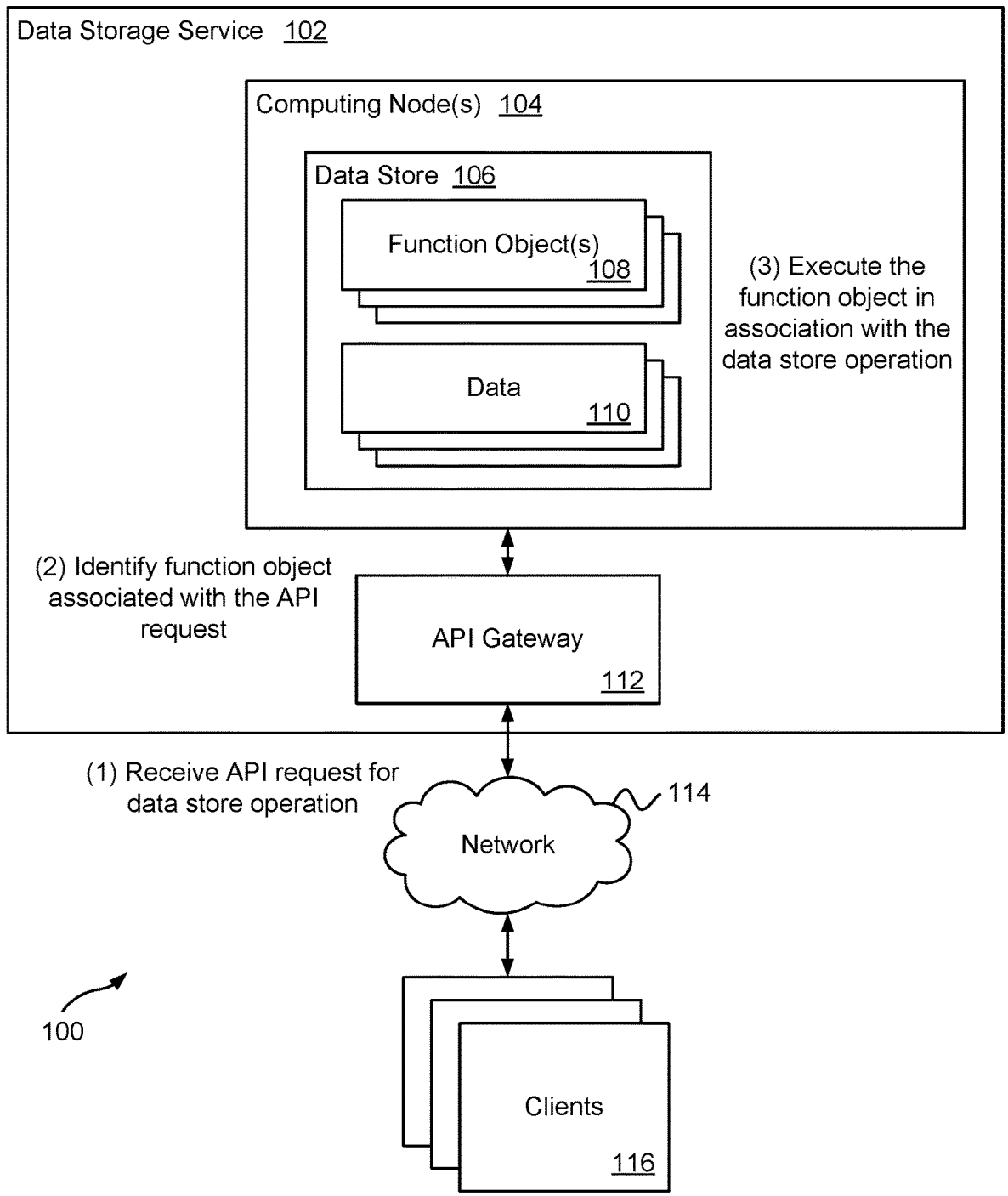
FIG. 1 is a block diagram illustrating an example system for extending a data store operation using a function object executed in a data storage system.

A technology is described for extending the functionality of data store operations in a data store service using function objects. A function object may be a custom function that extends, overloads, pre-processes, post-processes, or replaces generic functionality of a data store operation in a data store service provided as a networked service. A function object may be executed in association with a request to execute a data store operation. For example, a function object can be executed in association with executing a GET, PUT, or DELETE object store operation. Further, requesting the execution of a GET object store operation associated with a function object may result in the execution of both the GET object store operation and the function object by the data store service.

In one example, the functionality of a data store operation may be extended by associating a function object with a data store operation and an attribute or parameter may be used to call the data store operation defined for the function object. For example, a function object may be associated with a customer identifier, an object store (e.g., bucket), a data store table, or other attribute of a data store operation call. In another example, a data store operation request may specify a function object to execute in association with executing a data store operation. For example, a request to execute a GET, PUT, or DELETE data store operation may include an identifier for a function object to execute in association with the GET data store operation. As a specific example, a GET data store operation request may include an identifier for a function object that decompresses a data object prior to returning the data object to a requester.

A request to execute a data store operation may be analyzed to determine whether the data store operation request may be associated with a function object. For example, the attributes or parameters of the request may be analyzed to determine whether an attribute or parameter may be associated with a function object. In the case that a request may be associated with a function object, the function object may be executed in association with the data store operation. For example, the function object may be executed before or after executing the data store operation (extending or overloading the data store operation), or the function object may be executed in place of the data store operation (replacing the data store operation).

In the past, working with data managed by a data store service may have involved retrieving the data from a data store and working with the data using a client or middleware business rules. In some situations, data store abstractions have been created using clients that interface with a data store service. The client may act as a data source intermediary and may receive data requests from other clients. For example, in response to a request, the client may retrieve data from the data store service and perform some action on the data and return the data to a requesting client. This scenario may have resulted in additional development and maintenance of the intermediary client.

As a result of the current technology, actions that may have been performed by a client acting as a data source intermediary, or actions performed by the clients themselves can be performed using a function object in association with executing a data store operation request. As such, clients can interact with a data store service and actions associated with data referenced by a data store operation may be performed prior to returning results to the clients.

FIG. 1 is a block diagram illustrating a high level example of a system environment 100 that includes a data storage service 102 accessible to clients 116 as a networked service via a network 114 and an API (Application Programming Interface) gateway 112. Illustratively, the data storage service 102 may be an object storage system, a relational data storage system, a NoSQL storage system, or another type of data storage system. In one example, the data storage service 102 may be a distributed system having multiple computing nodes 104.

A computing node 104 included in the data storage service 102 may include a data store(s) 106 that contains data 110 and one or more function objects 108. A function object 108 stored in a data store 106 may be a function, subroutine, procedure, or method that extends, overloads, or replaces functionality of a data store operation that, in one example, operates on the data 110 stored in the data store 106. A function object 108 may be specific to a particular customer or group of customers, and may overload the generic functionality of a data store operation without modifying the generic functionality of the data store 106. Namely, a function object 108 may execute independently of the data store's native data store operations. For instance, the data store's client libraries and APIs may be unchanged and unaware that a function object 108 is executing. For example, a function object 108 associated with the GET data store operation may overload the generic functionality of the GET data store operation by executing independently of the GET data store operation while utilizing the GET data store operation as part of performing a task. As a few specific examples, a function object 108 may extend a PUT data store operation by performing the PUT and then sending a notification to a customer that includes details for data 110 that was stored to a data store 106. A function object 108 may overload a PUT data store operation by compressing data 110 prior to storing the data 110 to a data store 106 and overloading a GET data store operation by decompressing the data 110 prior to returning the data to a client 116. As another example, a function object 108 may replace a PUT data store operation by detecting suspicious data prior to storing the suspicious data in a data store 106 and placing the suspicious data in quarantine.

Other functions performed by a function object 108 in association with executing a data store operation may include preprocessing and post-processing data 110 (e.g., compressing or encrypting data 110), deduplication of data 110, auditing data 110, searching data 110 (e.g., perform grep on data 110), sending data related notifications, logging, scheduling events (e.g., schedule execution of another function object 108), data 110 migration, data 110 archiving, launching of additional processes, computing instances, or service requests, as well as other functions.

In one example, the API gateway 112 may be configured to receive API requests from clients 116 or applications requesting the execution of a data store operation. Data store operations may be methods that operate on data 110 stored in a data store 106. For example, data store operations may include object data store operations (e.g., GET, PUT, POST, and DELETE), SQL (Structured Query Language) statements (e.g., SELECT, INSERT, UPDATE, and DELETE), as well as other data store operations. Some data store operations may be linked to function objects 108. More specifically, a data store operation associated with a customer account or another attribute of the data store operation may be linked to a function object. Therefore, an API request received at the API gateway 112 may be analyzed to determine whether the API request may be linked to a function object 108 by way of a customer account and/or another attribute of the API request.

The API gateway 112 may be configured to analyze an API request received at the API gateway 112 and determine whether the API request includes a request attribute (e.g., data store operation, API parameter and/or API header information) that may be associated with a function object 108. In one example, an API request may specify a function object 108 to invoke as part of the API request via an API parameter. The API parameter may contain a function object identifier (e.g., a function object name or symbolic identifier) that may be used to identify a function object 108. The API request may also include function object parameters that are passed to the function object 108. As a specific example, an API request for a GET data store operation may include a function object identifier for a function object 108 configured to search data 110 in a data store 106 for a string value. The API request for the GET data store operation may include a search value parameter containing a string value to be searched for, which may be passed to the function object 108 when the function object 108 is invoked. For example, the API request may specify the function object identifier, the string value, and a data store 106 to be searched and return a true or false indicator as to whether the string value was found.

In another example, an API request may be linked to a function object 108 by way of a request attribute included in the API request. More specifically, a function object 108 may be linked to a customer account, a data store 106, data 110, a data object, a client 116, or some other attribute that may be specified in an API request. The API gateway 112 may be configured to analyze an API request for request attributes that may be linked to a function object 108. For example, API request attributes may be analyzed to determine whether a link exists between one or more request attribute values and a function object 108.

As one non-limiting example, an API request to execute a data store operation may include a customer identifier associated with a function object. The API gateway 112 may be configured to analyze API requests to identify the customer identifier and determine whether the customer identifier and the data store operation requested in the API request may be associated with a function object 108. In the case that the data store operation and the customer identifier are associated with a function object 108, the function object 108 may be executed in response to the API request. Illustratively, a function object 108 may be developed by a customer of a computing service provider to extend, overload, or replace a data store operation executed on behalf of the customer. As a specific example, a customer may construct a function object 108 to overload a GET data store operation. The GET data store operation may be constructed to retrieve a customer's compressed data 110 from a data store 106 and decompress the customer's data 110 prior to returning the data 110 to a client 116. A customer's function object 108 may be stored on a data store 106 that includes the customer's data 110 and may be associated with a customer identifier for the customer. For example, a customer may register a function object 108 with the data storage service 102 and associate the function object 108 with a customer identifier for the customer. Consequently, an API request for the data store operation that includes the customer identifier may result in identifying the function object 108 and invoking the function object 108.

As another non-limiting example, an API request to execute a data store operation may include a data store attribute associated with a function object 108. A data store attribute may identify a particular data store 106, table, field, data object, value, or the like, where data is to be stored. For example, an API request may include an object store attribute that identifies an object in an object store associated with a function object. The API gateway 112 may be configured to analyze the API request and identify the object store attribute and determine whether the object store attribute and the data store operation requested in the API request may be associated with a function object 108. As a specific example, an API request may request a PUT data store operation that stores an object to a specified object store. The object store may be linked to a function object 108 that extends the PUT data store operation by sending a notification to an object store administrator informing the administrator that the PUT data store operation is being performed. Thus, an API request that includes an API parameter identifying the object store may be analyzed when received at the API gateway 112 and the function object 108 associated with the object store may be identified and invoked in association with the PUT data store operation. More specifically, in determining that the object store is associated with the function object 108, the function object 108 may be executed sending a notification to an object store administrator and the PUT data store operation that stores the object to the object store may be executed.

As yet another non-limiting example, an API request to execute a data store operation may include a pattern that may be associated with a function object 108. A pattern may be a combination of API parameters and/or API request attributes associated with a function object 108. As one example, a function object 108 may be associated with a customer identifier and a data store field. In the event that an API request received at the API gateway 112 includes the customer identifier and specifies the data store field, the function object 108 may be executed. As a specific example, a function object 108 configured to anonymize sensitive data may be linked to an INSERT data store operation, a customer identifier, and a data store field that contains the sensitive data. In the event that an API request for an INSERT data store operation is received that includes the customer identifier and the data store field, the function object 108 that anonymizes the data being inserted may be executed and the anonymized data may be inserted into the data store 106. Any number of patterns can be linked to a function object 108 and the API gateway 112 may be configured to analyze API requests for a pattern that may be linked to a function object 108.

Other API parameters and/or API request attributes may be linked to function objects 108 as well (e.g., client identifiers, time and/or date of an API request, etc.), and the API parameters and API request attributes may be analyzed to determine whether a function object 108 association exists. In some examples, function objects 108 may be linked to data 110 (e.g., data attributes). For example, data context may be used to link a function object 108 to data 110 (e.g., data type, data location, data owner, and the like.) API parameters and API request attributes may be analyzed to determine whether an association exists between a function object and an API parameter that references data 110. Also, a function object 108 may be linked to other additional function objects via stacking or chaining function objects 108 that are executed in association with the function object 108 and a data store operation. Stacking or chaining can be done in an API request, in a function object 108, or both.

Associating a function object 108 with an API parameter, API request attribute, data store 106 (object bucket), data 110, or with other function objects 108 (e.g., stacking or chaining) may, in one example, be specified by a customer of a computing service provider or an administrator. In one example, a function object 108 may be registered with the data storage service 102. For instance, as described more fully in relation to FIG. 5, a registration may be received at the data storage service 102 that includes a function object 108 and instructions that link the function object 108 to an API request to execute a data store operation.

In one example, a function object 108 may be stored to a data store 106 that contains data 110 used by a data store operation linked to the function object 108, or data 110 used as an input parameter(s) by the function object 108. Further, the function object 108, when invoked, may be executed on the computing node 104 that hosts the data store 106 containing the function object 108. Accordingly, the computing resources of the computing node 104 may be used to execute the function object 108 using the data 110 located on the computing node 104. Storing a function object 108 on a data store 106 that contains data 110 operated on by the function object 108 may result in certain execution efficiencies related to the proximity of the function object 108 to the data 110.

After receiving an API request at the API gateway 112, the API request may be evaluated to determine an association between the API request and a function object 108. In the case that the API request may be linked to a function object 108, the function object 108 may be retrieved from the data store 106 where the function object 108 may be stored and the function object 108 may be executed in association with executing a data store operation specified in the API request. Results of the API request may then be reported back to the client 116 that sent the API request.

In the case that execution of a data store operation linked to a function object 108 fails or time-outs, information related to the failure can be returned to a customer. For example, a function object 108 may be configured to handle exception errors and/or a function error lookup table may be used to handle exception errors that occur in relation to executing a data store operation linked to a function object 108. A customer and/or an administrator may be notified of the exception error via a notification interface, push message, or other notification technique.

Figure 2:
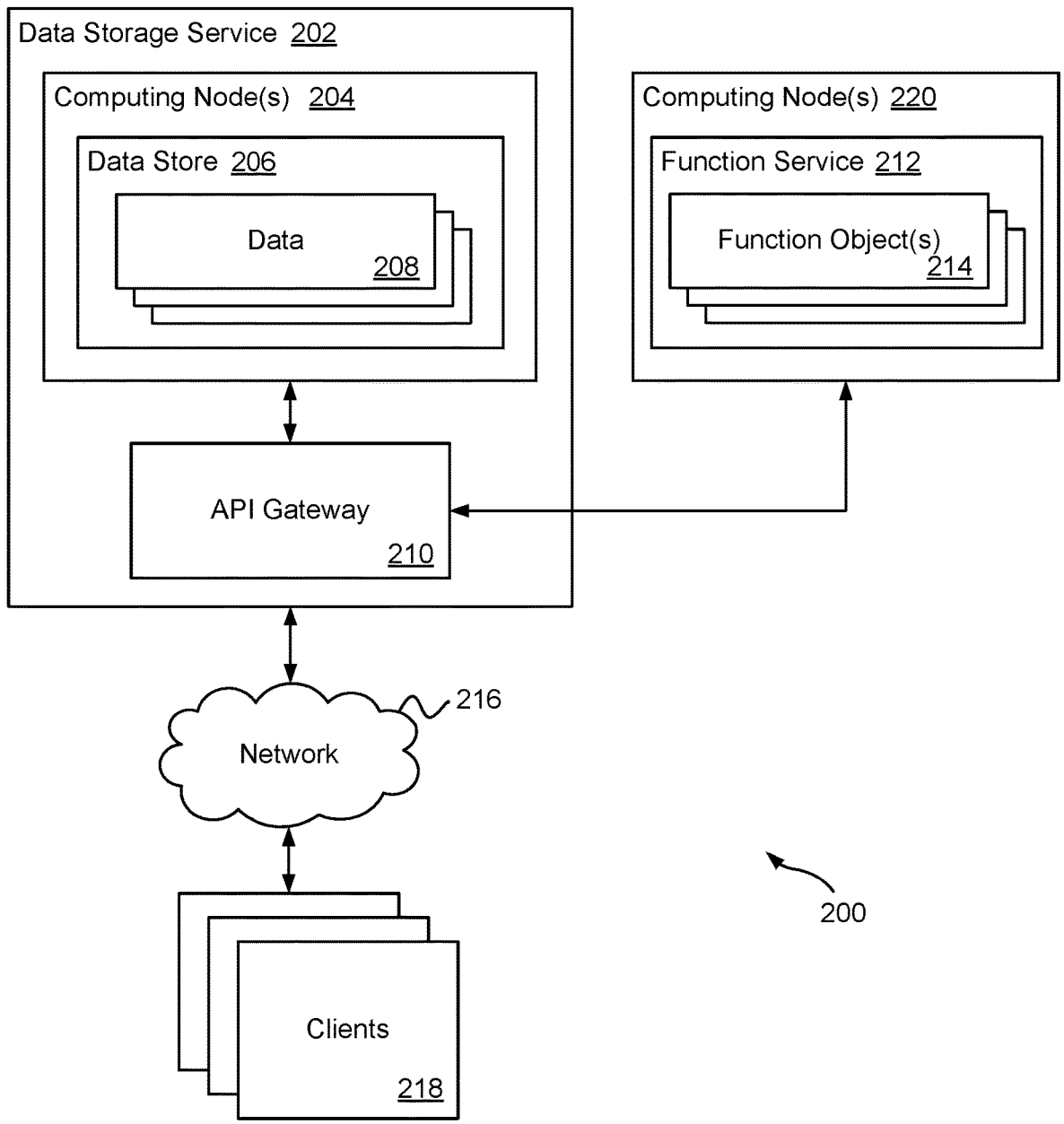
FIG. 2 is a block diagram that illustrates an example system for extending a data store operation using a function object executed using a function service.

FIG. 2 is a block diagram illustrating a high level example of a system environment 200 that includes a function service 212 configured to execute function objects 214 in association with an API request received at an API gateway 210. A computing node 220 may be configured to host the function service 212. As such, data processing that may have been performed using a client 218 in the past may be performed using a function object 214 and the computing resources of the computing node 220. The system environment 200 may also include a data storage service 202 comprising a plurality of computing nodes 204 that hosts data stores 206. The data storage service 202 may be accessible to clients 218 as a networked service via a network 216 and the API gateway 210.

In this example, the API gateway 210 may be configured to receive an API request linked to a function object 214 and request the function service 212 to execute the function object 214. For example, a client 218 may send an API request to execute a data store operation to the API gateway 210 and the API request may be evaluated by the API gateway 210 to determine whether the API request may be linked to a function object 214. In the case that the API request is linked to a function object 214, the API gateway 210 may be configured to send a request (e.g., via an API call) to the function service 212 requesting the function service 212 to execute the function object 214.

As mentioned above, the function service 212 may be hosted by a computing node 220 that may be in communication with the API gateway 210. The function service 212 may be configured to receive requests to execute a function object 214 from the API gateway 210 and obtain a function object 214 specified in the request. For example, the API gateway 210 may send an execution request to the function service 212 that includes a function object identifier for a function object 214 and any parameters that may be used in executing the function object 214. A function object 214 may be stored on the computing node 220, or may be stored within the data storage service 202. As such, the function object 214 may be obtained and executed by the function service 212 on the computing node 220.

In executing a function object 214, the function service 212 may be configured to communicate with the data storage service 202 (e.g., via the API gateway 210) allowing for exchange of data 208 between the data storage service 202 and the function service 212 as part of executing a function object 214. For example, the function service 212 may obtain data 208 from a data store 206 or send data 208 to a data store 206 by sending API requests related to the data 208 to the API gateway 210. As a specific example, an API request to perform a data store operation may be associated with a function object 214 that encrypts data 208 as part of a PUT data store operation and decrypts the data 208 as part of a GET data store operation. In receiving an API request to execute the PUT data store operation at the API gateway 210, data 208 included or referenced in the PUT data store operation request may be sent to the function service 212 that executes the function object 214 configured to encrypt the data 208 and store the data 208 to a data store 206 in the data storage service 202. In receiving an API request to execute the GET data store operation at the API gateway 210, a request may be made to the function service 212 to execute the function object 214 that retrieves the data 208 from the data store 206 located in the data storage service 202 and decrypts the data 208, whereupon the data 208 may be returned to a client 218 via the API gateway 210.

Figure 3:
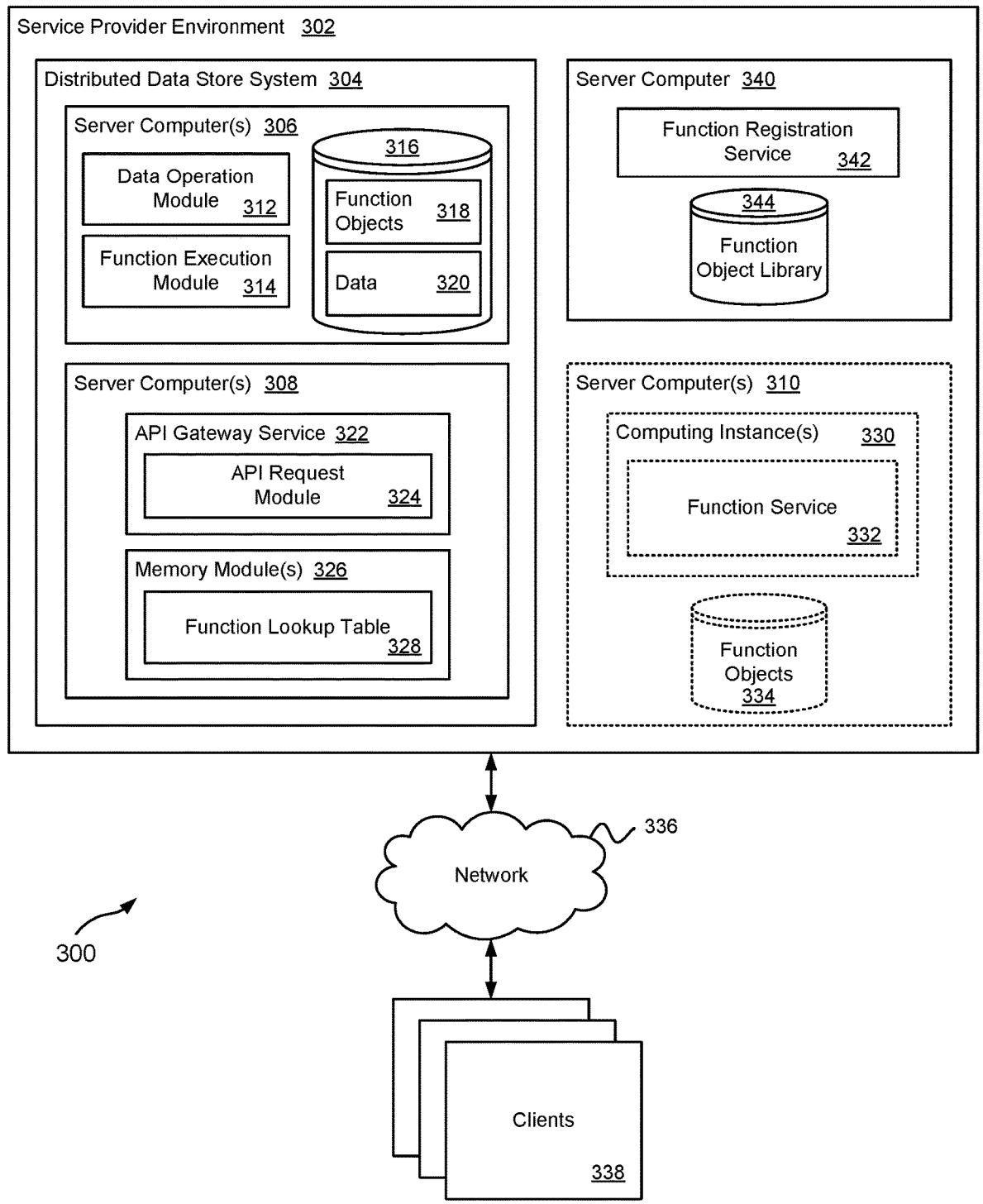
FIG. 3 is a block diagram that illustrates various example components included in a system that uses function objects to extend the functionality of data store operations.

FIG. 3 illustrates components of an example system 300 on which the present technology may be executed. The system 300 may include a service provider environment 302 that includes a distributed data store service 304 comprising server computers 306 and 308 that may be in communication with a number of clients 338 via a network 336. The distributed data store service 304 may include multiple server computers 306 containing data stores 316 for storing data 320 and function objects 318 within the distributed data store service 304. The server computers 306 may be accessible to clients 338 via an API gateway service 322 hosted on the server computer 308. Also, the service provider environment 302 may include a server computer 340 that hosts a function registration service 342 used to register a function object 318 or a function object selected from a function object library 334 with the distributed data store service 304. In some examples, the service provider environment 302 may include a server computer 310 that hosts a function execution service 332 executing on a computing instance 330.

The server computer 308 may include an API gateway service 322 having an API request module 324. The API gateway service 322 may be a managed service that acts as a "front door" for clients 338 to access data 320 stored in the distributed data store service 304 and invoke function objects 318 within the distributed data store service 304. The API request module 324 may be configured to analyze API requests received at the API gateway service 322 and determine whether the API request may be associated with a function object 318. In particular, API parameters included with API request may be analyzed to determine whether one or more of the API parameters may be linked to a function object 318, or whether an API parameter is being used to call a particular function object 318. Also, other API request attributes (e.g., API header information) for an API request may be analyzed to determine whether any of the API request attributes may be linked to a function object 318.

In one example, a function lookup table 328 may be used by the API request module 324 to identify a link between a function object 318 and an API request attribute. The function lookup table 328 may contain API request attribute/value pairs or records linked to function objects 318. The API request module 324 may be configured to query the function lookup table 328 for a function object 318 (i.e., a function object identifier) associated with an API request attribute/value pair. In one example, the function lookup table 328 may be cached in a memory module(s) 326 on the server computer 308 in order to decrease query times associated with querying the function lookup table 328 for a function object 318.

The API request module 324 may be configured to provide an API request associated with a function object 318 to a function execution module 314 that executes the function object 318 in association with executing a data store operation specified in the API request. API requests that are not associated with a function object 318 may be provided to a data operation module 312 configured to execute data store operations in response to API requests. The data operation module 312 may be configured to execute data store operations associated with the distributed data store service 304 (e.g., GET, PUT, POST, and DELETE data store operations for distributed object data store services, SELECT, INSERT, UPDATE, and DELETE data store operations for SQL distributed data store services, etc.). Requests to execute a data store operation may be received from the API gateway service 322 or the function execution module 312, and the data store operation may be executed in association with data 320 on the server computer 306.

The function execution module 314 and the data operation module 312 may be hosted by the server computer 306. The function execution module 314 may be configured to execute a function object 318 (or launch an execution object on the function service 332) stored in the data store 316 in response to an API request linked to the function object 318 received at the API gateway service 322. For example, the API gateway service 322 may provide a function object identifier for a function object 318 to the function execution module 314 and the function object identifier may be used by the function execution module 314 to invoke the function object 318. More specifically, the function object 318 may be retrieved from the data store 316 and the function object 318 may be executed using the computing resources of the server computer 306. A function object 318 may extend a data store operation, overload a data store operation, or replace a data store operation. Therefore, executing a function object 318 may result in executing one or more data store operations and utilizing data 320 associated with a data store operation. In executing a function object 318, the function execution module 314 may make data operation requests to the data operation module 312 to execute a data store operation. As a specific example, a function object 318 may include a GET data store operation. In executing the function object 318, the function execution module 314 may make a request to the data operation module 312 to execute the GET data store operation and return data objects associated with the GET data store operation to the function execution module 314. The data objects may then be used in operations that result in additional data store operation requests made to the data operation module 312 before returning some result to a client 338 that requested the execution of the function object 318.

In an alternative example, a computing instance 330 executing on a server computer 310 included in the service provider environment 302 may host a function service 332 configured to execute function objects 318 or 334 in association with an API request linked to a function object 318 or 334 received at the API gateway service 322. In one example, the function service 332 may obtain and execute function objects 318 stored in a data store 316 located in the distributed data store service 304. In another example, function objects 334 may be stored on a server computer 310 outside of the distributed data store service 304.

The distributed data store service 304 may be accessible to the function service 332 by way of the API gateway service 322. API requests linked to a function object 334 received at the API gateway service 322 may be redirected to the function service 332 and the function service 332 may be configured to retrieve the function object 334 and execute the function object 334. As part of executing a function object 334, the function service 332 may make data operation requests to the data operation module 312 via API requests sent to the API gateway service 322. The results of executing a function object 334 may be sent to a client 338 associated with the API request linked to the function object 332 by way of the API gateway service 322.

One server computer 340 may host a function registration service 342 that may be used to register a function object 318 with the distributed data store service 304 and may link the function object 318 to an API request to execute a data store operation. In one example, a function object 318 may be registered with the distributed data store service 304 by providing (e.g., uploading) the function object 318 to the distributed data store service 304 and specifying a data store operation that is to be extended, overloaded, or replaced by the function object 318. The function object 318 may be stored to a data store 316 that includes data 320 used by the function object 318. A record associating the function object 318 with the data store operation may be created in a function lookup table 328. The function lookup table 328 may be used by the API request module 324 to identify API requests that are associated with the function object 318 when the API requests are received at the API gateway service 322.

In another example, a function object library 344 may be made available to customers of the service provider environment 302. Illustratively, the function object library 344 may include function objects developed by a service provider, customers of the service provider, and/or partners of the service provider. Function objects included in the function object library 344 may be shared between customers and/or may be offered for sale to customers via a function object marketplace. Function objects acquired by a customer from the function object library 344 may be registered with the distributed data store service 304 using the function registration service 342. More specifically, a customer may select a function object from the function object library 344 and the function object may be stored to a data store 316 containing the customer's data 320. A record may be created that links the function object 318 with the customer's account and a data store operation that the function object 318 extends, overloads, or replaces. Thereafter, the function object 318 may be executed in response to API requests associated with the customer account and the data store operation.

In the alternative example where the service provider environment 302 includes the function service 332 described earlier, a function object 334 may be registered with the function service 332 using the function registration service 342. For example, a customer of the service provider environment 302 may obtain a function object from the function object library 344 and the function object may be stored to a data store 316 in the distributed data store service 304 or may be stored on a server computer 310 outside of the distributed data store service 304 that hosts the function service 332.

A client 338 may make API requests to the API gateway service 322. A client 338 may include a device capable of sending and receiving data over a network 336 or a network service configured to make API requests to the API gateway service 322. Illustratively, a client 338 may comprise a computing device such as, but not limited to, a desktop computer, laptop or notebook computer, tablet computer, mainframe computer system, handheld computer, workstation, network computer, or other device with like capability.

The various processes and/or other functionality contained within the service provider environment 302 may be executed on one or more processors that are in communication with one or more memory modules. The service provider environment 302 may include a number of computing devices that are arranged, for example, in one or more server banks or computer banks or other arrangements. The computing devices may support the service provider environment 302 using hypervisors, virtual machine monitors (VMMs), and other virtualization software.

The term "data store" may refer to any device or combination of devices capable of storing, accessing, organizing and/or retrieving data, which may include any combination and number of data servers, relational databases, object oriented databases, cluster storage systems, data storage devices, data warehouses, flat files and data storage configuration in any centralized, distributed, or clustered environment. The storage system components of the data store may include storage systems such as a SAN (Storage Area Network), cloud storage network, volatile or non-volatile RAM, optical media, or hard-drive type media. The data store may be representative of a plurality of data stores as can be appreciated.

API calls, procedure calls or other network commands that may be made in relation to the modules and services included in the computing service environment 302 may be implemented according to different technologies, including, but not limited to, Representational state transfer (REST) technology or Simple Object Access Protocol (SOAP) technology. REST is an architectural style for distributed hypermedia systems. A RESTful API (which may also be referred to as a RESTful web service) is a web service API implemented using HTTP and REST technology. SOAP is a protocol for exchanging information in the context of Web-based services.

The network 336 may include any useful computing network, including an intranet, the Internet, a local area network, a wide area network, a wireless data network, or any other such network or combination thereof. Components utilized for such a system may depend at least in part upon the type of network and/or environment selected. Communication over the network may be enabled by wired or wireless connections and combinations thereof.

FIG. 3 illustrates that certain processing modules may be discussed in connection with this technology and these processing modules may be implemented as computing services. In one example configuration, a module may be considered a service with one or more processes executing on a server or other computer hardware. Such services may be centrally hosted functionality or a service application that may receive requests and provide output to other services or consumer devices. For example, modules providing services may be considered on-demand computing that are hosted in a server, virtualized service environment, grid or cluster computing system. An API may be provided for each module to enable a second module to send requests to and receive output from the first module. Such APIs may also allow third parties to interface with the module and make requests and receive output from the modules. While FIG. 3 illustrates an example of a system that may implement the techniques above, many other similar or different environments are possible. The example environments discussed and illustrated above are merely representative and not limiting.

Figure 4:
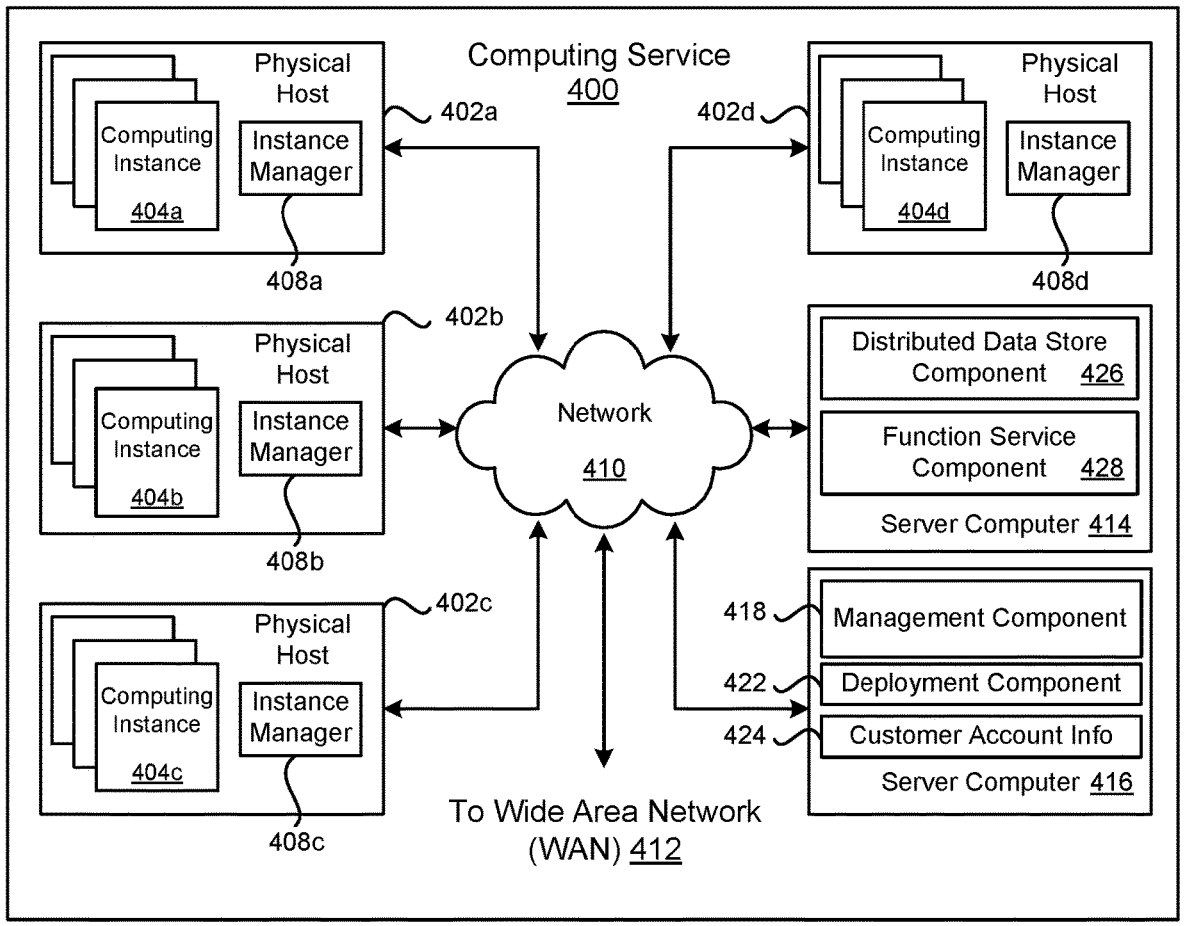
FIG. 4 is a block diagram that illustrates an example computing service environment that includes a distributed data store utilizing function objects to extend the functionality of data store operations.

FIG. 4 is a block diagram illustrating an example computing service 400 that may be used to execute and manage a number of computing instances 404a-d. In particular, the computing service 400 depicted illustrates one environment in which the technology described herein may be used. The computing service 400 may be one type of environment that includes various virtualized service resources that may be used, for instance, to host computing instances 404a-d.

The computing service 400 may be capable of delivery of computing, storage and networking capacity as a software service to a community of end recipients. In one example, the computing service 400 may be established for an organization by or on behalf of the organization. That is, the computing service 400 may offer a "private cloud environment." In another example, the computing service 400 may support a multi-tenant environment, wherein a plurality of customers may operate independently (i.e., a public cloud environment). Generally speaking, the computing service 400 may provide the following models: Infrastructure as a Service ("IaaS"), Platform as a Service ("PaaS"), and/or Software as a Service ("SaaS"). Other models may be provided. For the IaaS model, the computing service 400 may offer computers as physical or virtual machines and other resources. The virtual machines may be run as guests by a hypervisor, as described further below. The PaaS model delivers a computing platform that may include an operating system, programming language execution environment, database, and web server.

Application developers may develop and run their software solutions on the computing service platform without incurring the cost of buying and managing the underlying hardware and software. The SaaS model allows installation and operation of application software in the computing service 400. End customers may access the computing service 400 using networked client devices, such as desktop computers, laptops, tablets, smartphones, etc. running web browsers or other lightweight client applications, for example. Those familiar with the art will recognize that the computing service 400 may be described as a "cloud" environment.

The particularly illustrated computing service 400 may include a plurality of server computers 402a-d. While four server computers are shown, any number may be used, and large data centers may include thousands of server computers. The computing service 400 may provide computing resources for executing computing instances 404a-d. Computing instances 404a-d may, for example, be virtual machines. A virtual machine may be an instance of a software implementation of a machine (i.e. a computer) that executes applications like a physical machine. In the example of a virtual machine, each of the server computers 402a-d may be configured to execute an instance manager 408a-d capable of executing the instances. The instance manager 408a-d may be a hypervisor, virtual machine monitor (VMM), or another type of program configured to enable the execution of multiple computing instances 404a-d on a single server. Additionally, each of the computing instances 404a-d may be configured to execute one or more applications.

One or more server computers 414 and 416 may be reserved to execute software components for managing the operation of the computing service 400 and the computing instances 404a-d. A server 414 may execute a distributed data store component 426 used to manage a distributed data store service hosted on the computing instances 404a-d and a function service component 428 used to execute function objects as described earlier. Customers of a distributed data store may provide the function objects that extend, overload, or replace data store operations performed by the distributed data store component 426. The distributed data store component 426 may be used to manage the customers' function objects.

A server computer 416 may execute a management component 418. A customer may access the management component 418 to configure various aspects of the operation of the computing instances 404a-d purchased by a customer. For example, the customer may setup computing instances 404a-d and make changes to the configuration of the computing instances 404a-d.

A deployment component 422 may be used to assist customers in the deployment of computing instances 404a-d. The deployment component 422 may have access to account information associated with the computing instances 404a-d, such as the name of an owner of the account, credit card information, country of the owner, etc. The deployment component 422 may receive a configuration from a customer that includes data describing how computing instances 404a-d may be configured. For example, the configuration may include an operating system, provide one or more applications to be installed in computing instances 404a-d, provide scripts and/or other types of code to be executed for configuring computing instances 404a-d, provide cache logic specifying how an application cache should be prepared, and other types of information. The deployment component 422 may utilize the customer-provided configuration and cache logic to configure, prime, and launch computing instances 404a-d. The configuration, cache logic, and other information may be specified by a customer accessing the management component 418 or by providing this information directly to the deployment component 422.

Customer account information 424 may include any desired information associated with a customer of the multi-tenant environment. For example, the customer account information may include a unique identifier for a customer, a customer address, billing information, licensing information, customization parameters for launching instances, scheduling information, etc. As described above, the customer account information 424 may also include security information used in encryption of asynchronous responses to API requests. By "asynchronous" it is meant that the API response may be made at any time after the initial request and with a different network connection.

A network 410 may be utilized to interconnect the computing service 400 and the server computers 402a-d, 416. The network 410 may be a local area network (LAN) and may be connected to a Wide Area Network (WAN) 412 or the Internet, so that end customers may access the computing service 400. The network topology illustrated in FIG. 4 has been simplified, many more networks and networking devices may be utilized to interconnect the various computing systems disclosed herein.

Figure 5:
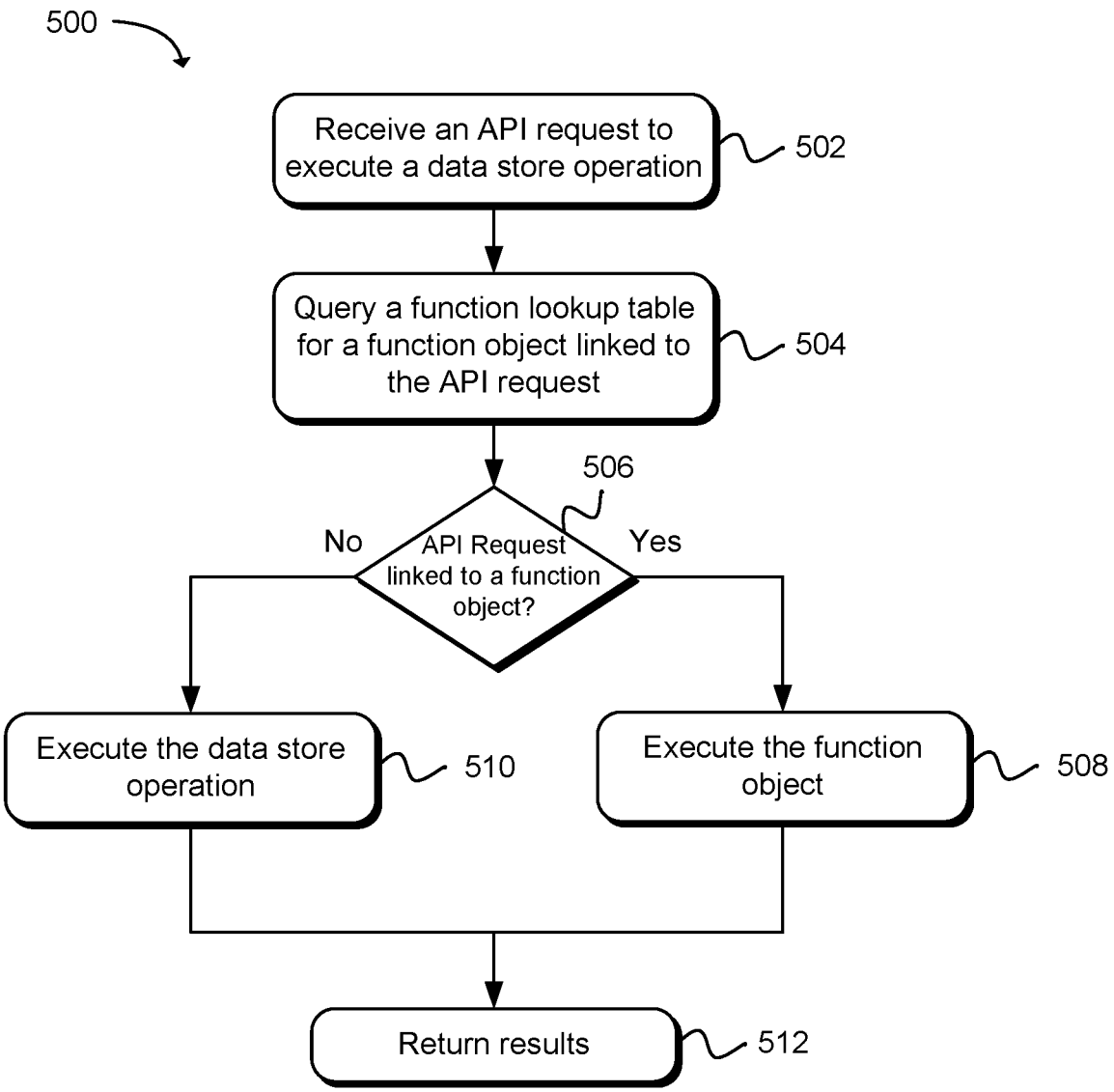
FIG. 5 is a flow diagram that illustrates an example method for handling a request to execute a data store operation associated with a function object.

Moving now to FIG. 5, a block diagram illustrates an example method 500 for handling a customer API request to execute a data store operation in a data store service that utilizes function objects. As described earlier, a data store operation may comprise an object data store operation (e.g., GET, PUT, POST, DELETE, etc.), a relational data store operation (e.g., SELECT, INSERT, UPDATE, DELETE, etc.), or other data store operation. In one example, the API request may include request attributes and may be associated with a customer account. One or more of the request attributes and the customer account may be linked to a function object that extends the data store operation, overloads the data store operation, or replaces the data store operation. A customer may develop a function object and link the function object to a data store operation and/or to an object store, object, table, column, field, or combination of attributes that may be specified in an API request.

As in block 502, the API request to execute the data store operation may be received at the data store service. The API request may be analyzed to determine whether any request attributes may be associated with a function object. A customer may use a request attribute to call a function object to execute in association with executing a data store operation, or a request attribute included in an API request may be linked to a function object.

As in block 504, a lookup table or database may be queried for a function object that may be linked to a request attribute. For example, request attributes may be analyzed to determine whether one or more request attributes may be linked to a function object by querying the function lookup table.

As in block 506, in the case that the API request to execute the data store operation is associated with a function object, then as in block 508, the function object may be executed. For example, the function object may be retrieved from a storage location (e.g., an object store that also stores data that is operated on by the function object) and the function object may be executed (e.g., using the computing resources of a computing node upon which the function object is stored) in association with executing the data store operation specified in the request. For example, the function object may be executed in association with performing a GET, PUT, DELETE, or the like. As in block 512, the results of executing the function object may be returned to a client and/or to a data store as specified by the data store operation request or the function object.

In the case that the API request to execute the data store operation is not associated with a function object, then as in block 510, the data store operation specified by the API request may be executed. For example, where the API request is not associated with a function object, a GET, PUT, DELETE, or the like specified by the API request may be executed, and as in block 512, the results of the data store operation may be returned as specified by the data store operation request.

Figure 6:
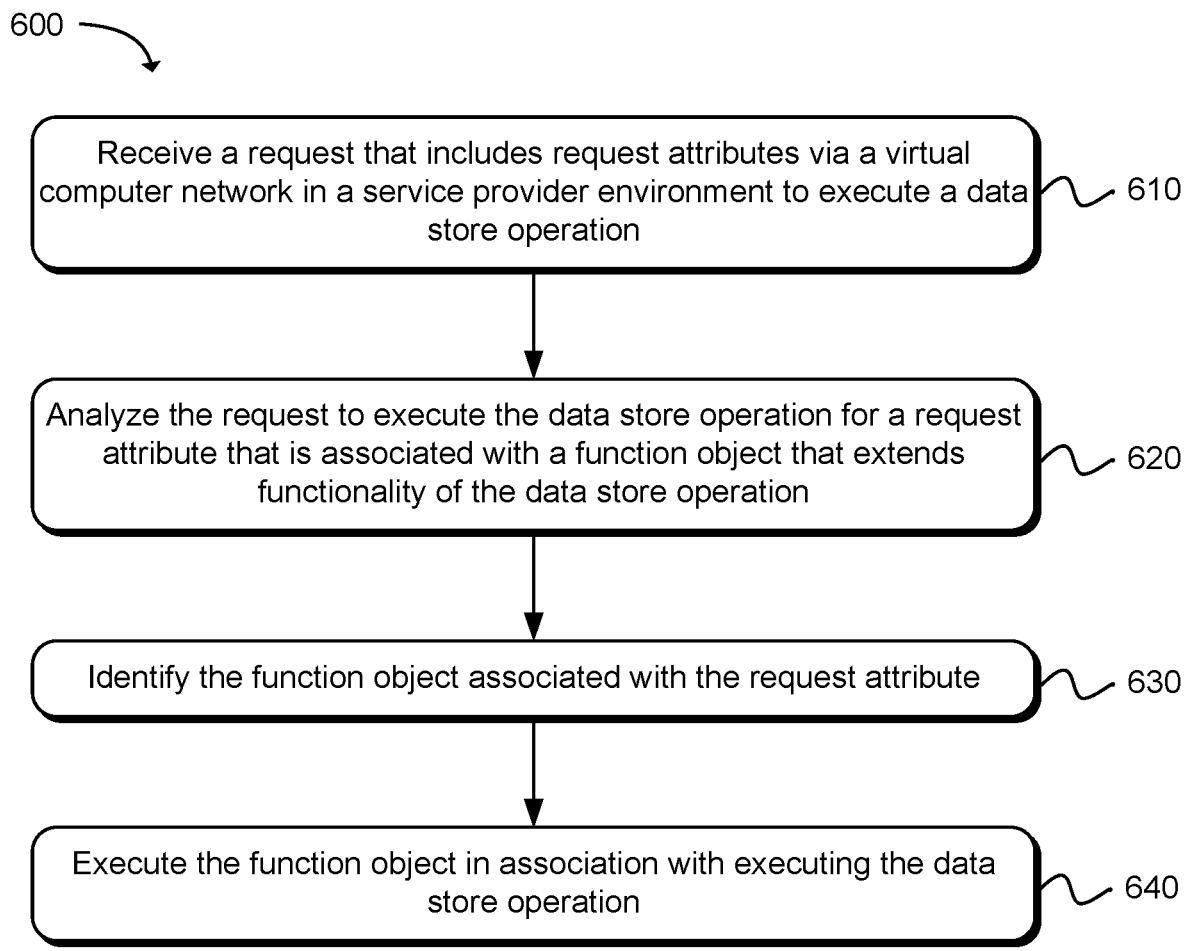
FIG. 6 is a flow diagram illustrating an example method for executing a function object in response to a request to execute a data store operation.

FIG. 6 is a flow diagram illustrating an example method 600 for receiving a request to execute a data store operation associated with a function object. Starting in block 610, a request may be received that includes request attributes via a virtual computer network in a service provider environment to execute a data store operation. The request may be received at an API gateway that has instructions to execute the function object using a computing instance included in a computing service environment.

As in block 620, the request to execute the data store operation may be analyzed for a request attribute that may be associated with a function object that extends functionality of the data store operation. As one example, the request may be analyzed to identify a customer identifier included in the request that may be associated with the function object. As another example, the request may be analyzed to identify an object store attribute that identifies an object store in an object store system that contains data used by the data store operation. As yet another example, the request may be analyzed to identify a pattern of request attributes that may be associated with the function object.

As in block 630, the function object associated with the request attribute may be identified. For example, the function object may be obtained from a data store containing data used as an input parameter by the function object. As in block 640, the function object may be executed in association with executing the data store operation. For example, a computing node in the service provider environment may be instructed to obtain the function stored on the computing node and execute the function in association with executing the data store operation.

Figure 7:
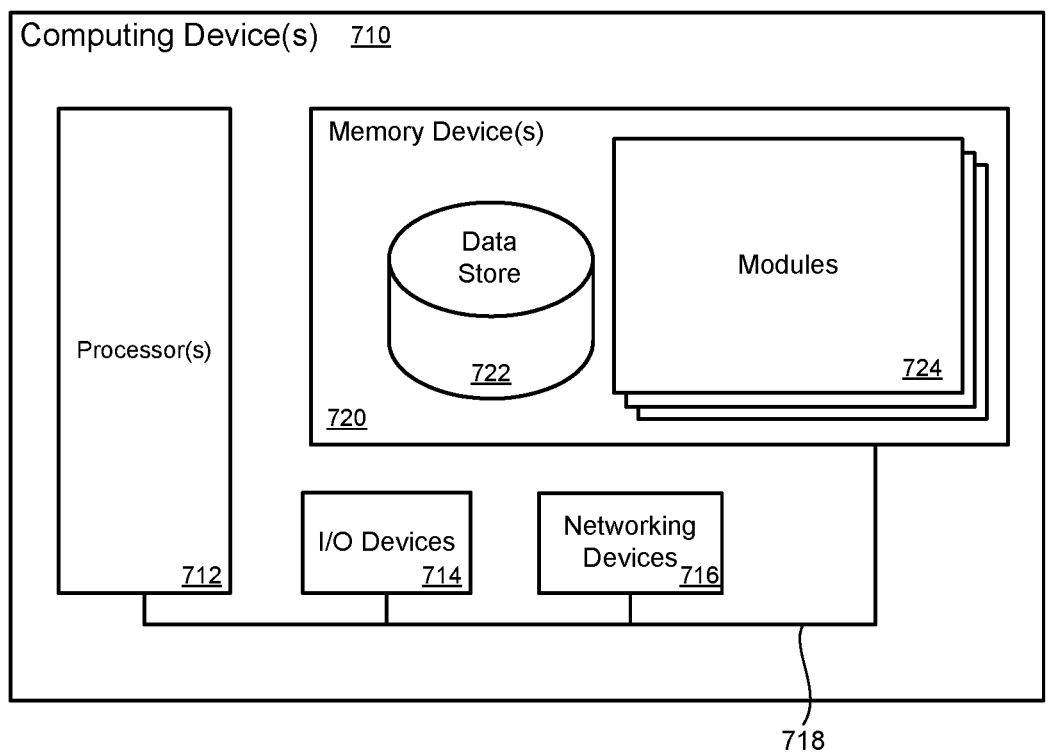
FIG. 7 is block diagram illustrating an example of a computing device that may be used to execute a method for handling a request to execute a data store operation that may be associated with a function object.

FIG. 7 illustrates a computing device 710 on which modules of this technology may execute. A computing device 710 is illustrated on which a high level example of the technology may be executed. The computing device 710 may include one or more processors 712 that are in communication with memory devices 720. The computing device 710 may include a local communication interface 718 for the components in the computing device. For example, the local communication interface 718 may be a local data bus and/or any related address or control busses as may be desired.

The memory device 720 may contain modules 724 that are executable by the processor(s) 712 and data for the modules 724. The modules 724 may execute the functions described earlier. A data store 722 may also be located in the memory device 720 for storing data related to the modules 724 and other applications along with an operating system that is executable by the processor(s) 712.

Other applications may also be stored in the memory device 720 and may be executable by the processor(s) 712. Components or modules discussed in this description that may be implemented in the form of software using high programming level languages that are compiled, interpreted or executed using a hybrid of the methods.

The computing device may also have access to I/O (input/output) devices 714 that are usable by the computing devices. Networking devices 716 and similar communication devices may be included in the computing device. The networking devices 716 may be wired or wireless networking devices that connect to the internet, a LAN, WAN, or other computing network.

The components or modules that are shown as being stored in the memory device 720 may be executed by the processor(s) 712. The term "executable" may mean a program file that is in a form that may be executed by a processor 712. For example, a program in a higher level language may be compiled into machine code in a format that may be loaded into a random access portion of the memory device 720 and executed by the processor 712, or source code may be loaded by another executable program and interpreted to generate instructions in a random access portion of the memory to be executed by a processor. The executable program may be stored in any portion or component of the memory device 720. For example, the memory device 720 may be random access memory (RAM), read only memory (ROM), flash memory, a solid state drive, memory card, a hard drive, optical disk, floppy disk, magnetic tape, or any other memory components.

The processor 712 may represent multiple processors and the memory device 720 may represent multiple memory units that operate in parallel to the processing circuits. This may provide parallel processing channels for the processes and data in the system. The local interface 718 may be used as a network to facilitate communication between any of the multiple processors and multiple memories. The local interface 718 may use additional systems designed for coordinating communication such as load balancing, bulk data transfer and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions and may even be distributed over several different code segments, among different programs and across several memory devices. Similarly, operational data may be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, non-transitory media such as RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A distributed data store system comprising:
   at least one processor;
   a data store that is accessible as a networked service to a customer account of a multi-tenant environment, and the data store stores a function object configured to extend functionality of native data store operations; and
   a memory device including instructions that, when executed by the at least one processor, cause the distributed data store system to:
   register a function object with a data store service managed in the-multi-tenant environment, wherein registering the function object with the data store service associates the function object with the customer account of the multi-tenant environment, access to the function object restricted to the associated customer account;
   receive, at the data store service, an Application Programming Interface (API) request to execute a native data store operation that operates on data stored in the data store, wherein the API request includes an API parameter identifying the function object to be executed along with the native data store operation;
   analyze the API parameter to identify the customer account associated with the function object to be executed with the native data store operation to extend functionality of the native data store operation;

identify the function object stored in the data store associated with the customer account;

retrieve the function object from the data store; and initiate execution of the function object along with execution of the native data store operation to extend the functionality of the native data store operation.

2. A system as in claim 1, wherein the memory device includes instructions that, when executed by the at least one processor, causes the distributed data store system to further receive a registration for the function object that links the function object to the API request to execute the native data store operation.

3. A system as in claim 1, wherein the data store that stores the function object contains the data that is used by the native data store operation.

4. A system as in claim 1, wherein the function object is executed in association with the native data store operation by a computing node included in the distributed data store system of the multi-tenant environment that hosts the data store that stores the function object and the data that is operated on by the native data store operation.

5. A computer implemented method, comprising:

registering a function object with a data store service managed in a multi-tenant environment on behalf of a customer account, wherein execution of the function object is restricted to the customer account of the multi-tenant environment;

receiving, at the data store service, a request to execute a data store operation which is native to a data store and operates on data stored in the data store;

analyzing the request to execute the data store operation in order to identify a request attribute that corresponds to the customer account associated with the function object that extends functionality of the data store operation;

identifying the function object associated with the request attribute; and initiating execution of the function object in the multi-tenant environment along with execution of the data store operation to extend the functionality of the data store operation.

6. A method as in claim 5, wherein the function object is a customer specified custom function that overloads generic functionality of the data store operation in the data store service provided as a networked service.

7. A method as in claim 5, further comprising obtaining the function object from a data store containing data used as an input parameter by the function object.

8. A method as in claim 5, wherein identifying the function object associated with the request attribute further comprises performing a lookup operation in a lookup table for the request attribute that identifies the function object.

9. A method as in claim 5, wherein analyzing the request to identify a request attribute that is associated with the function object further comprises analyzing the request to identify a data type of the data that is associated with the function object.

10. A method as in claim 5, wherein analyzing the request to identify a request attribute that is associated with the function object further comprises analyzing the request to find an object store attribute that identifies an object store in an object store system that contains data used by the data store operation.

11. A method as in claim 5, wherein analyzing the request to identify a request attribute that is associated with the function object further comprises analyzing the request to identify a pattern of request attributes that are associated with the function object.

12. A method as in claim 5, wherein the request attribute included with the request to execute the data store operation identifies the function object.

13. A method as in claim 5, wherein receiving the request to execute the data store operation further comprises receiving the request at an API gateway having instructions to execute the function object using a computing instance included in the multi-tenant environment.

14. A method as in claim 5, wherein the data store service is a distributed object store service in the multi-tenant environment.

15. A method as in claim 5, wherein the function object is configured to preprocess data prior to returning the data in response to the request to execute the data store operation.

16. A method as in claim 5, wherein the function object is linked to an additional function object that is executed in association with the function object and the data store operation.

17. A method as in claim 5, wherein the function object is configured to schedule the execution of another function object.

18. A method as in claim 5, further comprising receiving a request to associate the function object selected from a function object library with the request attribute in a request attribute lookup table.

19. A method as in claim 5, wherein the function object is owned by the customer account of the multi-tenant environment.

20. A computer implemented method, comprising:

registering a function object with a distributed data store system managed in a multi-tenant environment on behalf of a customer account, wherein registering the function object with the distributed data store system associates the function object with the customer account of the multi-tenant environment and access to the function object is restricted to the associated customer account;

receiving a request to execute native data store operation, wherein the request is received via a virtual computer network in a distributed data store system that includes multiple computing nodes in the multi-tenant environment;

analyzing the request to execute the native data store operation to identify a request attribute that is associated with a function object to be executed with the native data store operation and to extend functionality of the native data store operation;

identifying the function object associated with the request attribute using a lookup table, wherein the function object is stored on a computing node that stores data used by the native data store operation;

obtaining the function object stored in the computing node; and initiating execution of the function object along with execution of the native data store operation to extend the functionality of the native data store operation.

21. A method as in claim 20, further comprising instructing the computing node to obtain the function object stored on the computing node and execute the function object in association with executing the native data store operation.

* * * * *